United States Patent [19]

Gerlach et al.

[11] Patent Number: 4,688,511
[45] Date of Patent: Aug. 25, 1987

[54] DIRT ACCUMULATION INDICATOR FOR AIR INTAKE FILTERS

[75] Inventors: Paul Gerlach, Ludwigsburg; Heinz E. Müller, Weissach, both of Fed. Rep. of Germany

[73] Assignee: Filterwerk Mann & Hummel GmbH, Ludwigsburg, Fed. Rep. of Germany

[21] Appl. No.: 761,289

[22] Filed: Aug. 1, 1985

[30] Foreign Application Priority Data

Aug. 1, 1984 [DE] Fed. Rep. of Germany ....... 3428307

[51] Int. Cl.⁴ ..................... B01D 46/00; G01L 19/12
[52] U.S. Cl. .................... 116/268; 55/274; 116/271
[58] Field of Search ............... 116/DIG. 25, DIG. 42, 116/271, 268, 270, 293, 296; 73/709, 386, 744, 715; 55/274

[56] References Cited

U.S. PATENT DOCUMENTS

| | | | |
|---|---|---|---|
| 148,673 | 3/1874 | Crosby | 73/709 |
| 376,103 | 1/1888 | Mitchell | 116/335 |
| 2,605,736 | 8/1952 | Cook et al. | 73/709 |
| 2,851,002 | 9/1958 | Angst | 73/386 |
| 3,465,707 | 9/1969 | Kashiwaba | 116/268 |
| 3,807,350 | 4/1974 | Powell | 73/432 A |
| 4,060,050 | 11/1977 | Simonsson | 116/DIG. 25 |
| 4,196,633 | 4/1980 | Bissell | 73/431 |

FOREIGN PATENT DOCUMENTS

| | | | |
|---|---|---|---|
| 421043 | 11/1925 | Fed. Rep. of Germany . | |
| 2346552 | 3/1975 | Fed. Rep. of Germany | 116/271 |
| 2617972 | 11/1977 | Fed. Rep. of Germany . | |
| 267098 | 12/1927 | United Kingdom | 73/709 |
| 470723 | 5/1973 | U.S.S.R. | 116/DIG. 25 |

Primary Examiner—Daniel M. Yasich
Attorney, Agent, or Firm—Joseph A. Geiger

[57] ABSTRACT

A device for the indication of dirt accumulation on an air intake filter by measuring the negative pressure in the clean air space of the filter, the device having a spring-biased diaphragm piston driving a pointer shaft by means of a bell crank with a gear segment, the pointer shaft carrying two diametrically oppositely arranged pointers with vertical and horizontal length portions moving in axial and radial portions of a pointer gap defined between the housing cover and an indicator dial carried by the cover. A ratchet mechanism serves to retain the pointer readout by blocking return movements of the indicator mechanism, the ratchet mechanism being releasable by means of a reset button on the cover of the device. The device is calibrated by means of an adjustable bell crank spring.

18 Claims, 6 Drawing Figures

DIRT ACCUMULATION INDICATOR FOR AIR INTAKE FILTERS

BACKGROUND OF THE INVENTION

1. Field of the Invention

The present invention relates to devices for the monitoring of flow resistances through the measurement of pressure differentials and, more particularly, to a device for the monitoring and visual indication of critical dirt accumulation in air intake filters.

2. Description of the Prior Art

It is known to measure the flow resistance across an air intake filter by means of a pressure gauge which, by indicating the pressure difference, or pressure drop, from the raw air space to the clean air space of the filter, gives a measure of the flow resistance encountered by the air. Since the flow resistance is a direct function of the accumulation of dirt on the filter element, an increase in the pressure drop across the filter element reflects a corresponding increase in the accumulation of dirt on the filter element.

The pressure in the raw air space of the filter can, as a rule, be equated with the atmospheric pressure. This makes it possible to use as a measure for the pressure drop the level of negative pressure inside the clean air space.

For the application under consideration, viz. the monitoring of dirt accumulation on the filter element of an air intake filter, the actual pressure level in the clean air space of the filter is not as important as the indication of changes in this pressure level over time. And, since the purpose of the device is essentially to give a warning signal, when the filter element requires cleaning or replacement, it may be sufficient for the device to merely give a reading of either "acceptable" or "unacceptable", using the colors green and red, for example.

A device of this type is known from the German Offenlegungsschrift No. 26 17 972. This publication discloses an indicator device which has a indicator slide arranged underneath a template with multiple window slots, so that a linear movement of the indicator slide brings red signal fields into alignment with the window slots, while shifting green signal fields out of the window slots. This linear movement of the indicator slide is indicative of the accumulation of dirt on the filter element of an air intake filter of an automotive internal combustion engine, for example.

The movement of the indicator slide is derived from a diaphragm piston which is arranged inside a housing and biased by a piston return spring in opposition to the action of the negative pressure on the underside of the piston. An axial displacement of the piston in response to a lowering of the pressure on the negative-pressure side of the piston is transmitted to the radially extending short arm of a bell crank of which the axially extending long arm drives the indicator slide along a radial, linear displacement path in a direction away from its rest position. The pivot axis of the bell crank is arranged at a lateral distance from and transversely to the axis of the diaphragm piston.

The indicator slide is biased in the direction towards its rest position by means of a slide return spring. The response of the indicator device can be calibrated through an adjustment of the compressive preload on the piston return spring.

A shortcoming of this known indicator device relates to the fact that the movement range of the indicator slide is very small and that, consequently, the reading of the indicator is not very accurate. Another shortcoming of this device is its restricted readability which is limited to a relatively narrow angle of vision.

It is also known form the prior art to translate the displacements of a diaphragm piston into rotary displacements of a pointer by using a bell crank which carries a gear segment on the extremity of its long arm. The gear segment drives a pinion on a shaft which carries the pointer. The axis of the pointer shaft is oriented parallel to the axis of the diaphragm piston.

Such a drive mechanism is suggested in the German Pat. No. 421 043. The mechanism uses a return spring which produces the opposing bias to the negative pressure on the diaphragm piston by engaging the long arm of the bell crank. This arrangement results in a higher bearing load on the bell crank. The off-center location of the pointer shaft represents a limitation to the movement range of the pointer.

SUMMARY OF THE INVENTION

Underlying the present invention is the primary objective of suggesting an improved indicator device for the monitoring of dirt accumulations on air intake filters. The device is to have a wider displacement range and it is to be readable from widely differing directions; it is to have minimal frictional resistance in its drive mechanism, and is to be simple in structure and suited for mass production at lost cost.

The present invention proposes to attain this objective by suggesting an improved indicator device which has a springbiased diaphragm piston arranged near the bottom wall of a pot-shaped indicator housing inside which an indicator shaft is journalled in alignment with the vertical housing center axis and connected to the diaphragm piston by drive transmission means.

In particular, the cover of the indicator housing has a top wall and an adjoining side wall, while defining a window covering at least a portion of both walls, the cover having attached to its inner side an indicator dial with a top wall and an adjoining side wall, whereby the concentric top walls and side walls of the cover and indicator dial define an annular pointer gap of which an axial, vertical gap portion has a lower end which is open to the indicator housing, and a radial, horizontal gap portion extends radially inwardly from the upper end of the axial gap portion.

Arranged for movement inside this angled pointer gap is a matchingly angled pointer which is carried by an indicator arm on the indicator shaft. Preferably, however, the indicator arm carries two pointers on diametrically opposite sides of the indicator shaft, whereby parallel vertical portions of the pointers reach into the axial pointer gap portions and adjoining short horizontal portions of the pointers reach into the radial pointer gap portions. For assembly purposes, the indicator dial has appropriate insertion slots for the horizontal pointer portions in its side wall.

This configuration offers the advantage of giving the device the widest possible angle of readability, as one or the other pointer is visible from virtually any direction except from below the indicator housing. This feature improves the versatility of the indicator device in terms of different mounting arrangements.

In order to further facilitate the reading of the indicator device, the invention suggests that the markings on the top wall and side wall of the indicator dial consist of diametrically oppositely located sector-shaped and rectangular dial fields, respectively, so that a pair of opposite large green dial fields represents a range of "acceptable" readings, and a pair of opposite small red dial fields represents "unacceptable" readings indicative of a critical accumulation of dirt on the air intake filter.

The invention further suggests drive transmission means in the form of a bell crank of which a short horizontal arm is biased against the upper side of the diaphragm piston by means of a bell crank spring and a vertical long arm carries a gear segment cooperating with a pinion on the vertical pointer shaft. The use of a horizontally oriented tension spring as the bell crank spring, in conjunction with the attachment of the other spring extremity to a rotatable spring adjustment pin in a vertical bore of the housing offers a calibration capability, by making it possible to adjust the bell crank spring from outside the indicator housing. Resilient friction legs on the spring adjustment pin temporarily hold its position inside the bore, the calibration setting being secured by a spot of glue.

In a further improvement, the invention suggests the use of means for blocking the return movements of the indicator shaft, in order to preserve the highest reading of the device, even after the air aspirating machine incorporating the air intake filter has been shut down. This return movement blocking means consists of a ratchet wheel segment on the bell crank pivot axis and a spring-biased ratchet pawl. A spring arm connected to the ratchet pawl provides the pawl engagement bias.

The horizontal pivot axis of the pawl is so arranged that a reset arm connected to the ratchet pawl is engageable by a vertically movable reset button, for the release of the pawl from the ratchet wheel segment to obtain a return movement of the drive mechanism. The reset button is conveniently arranged near the periphery of the cover, in a location in which it does not interfere with the pointer movements.

A housing insert simplifies the production and assembly of the device, the housing insert carrying the bell crank pivot shaft, the ratchet pawl pivot shaft, and the spring adjustment pin, while clamping the collar portion of the diaphragm piston against the housing bottom wall. A shoulder near the upper end of the housing insert provides a support for a reset button biasing spring and for the spring arm of the ratchet pawl.

An intermediate cover arranged between the housing insert and the cover of the device has a guide bore for the reset button. A transverse rib on the intermediate cover serves to retain the shaft of the ratchet pawl in its bearings.

The improved indicator device of the invention is ideally suited for mass production, using no machined parts. All the components of the indicator device are injection-molded plastic parts, with the exception of the bell crank spring and the piston return spring, which are helical springs, and the indicator shaft and the pivot shafts for the bell crank and the ratchet pawl, which are simple pins. The diaphragm piston is of soft rubber.

BRIEF DESCRIPTION OF THE DRAWINGS

Further special features and advantages of the invention will become apparent from the description following below, when taken together with the accompanying drawing which illustrates, by way of example, a preferred embodiment of the invention which is represented in the various figures as follows.

DESCRIPTION OF THE PREFERRED EMBODIMENT

Figure 3:
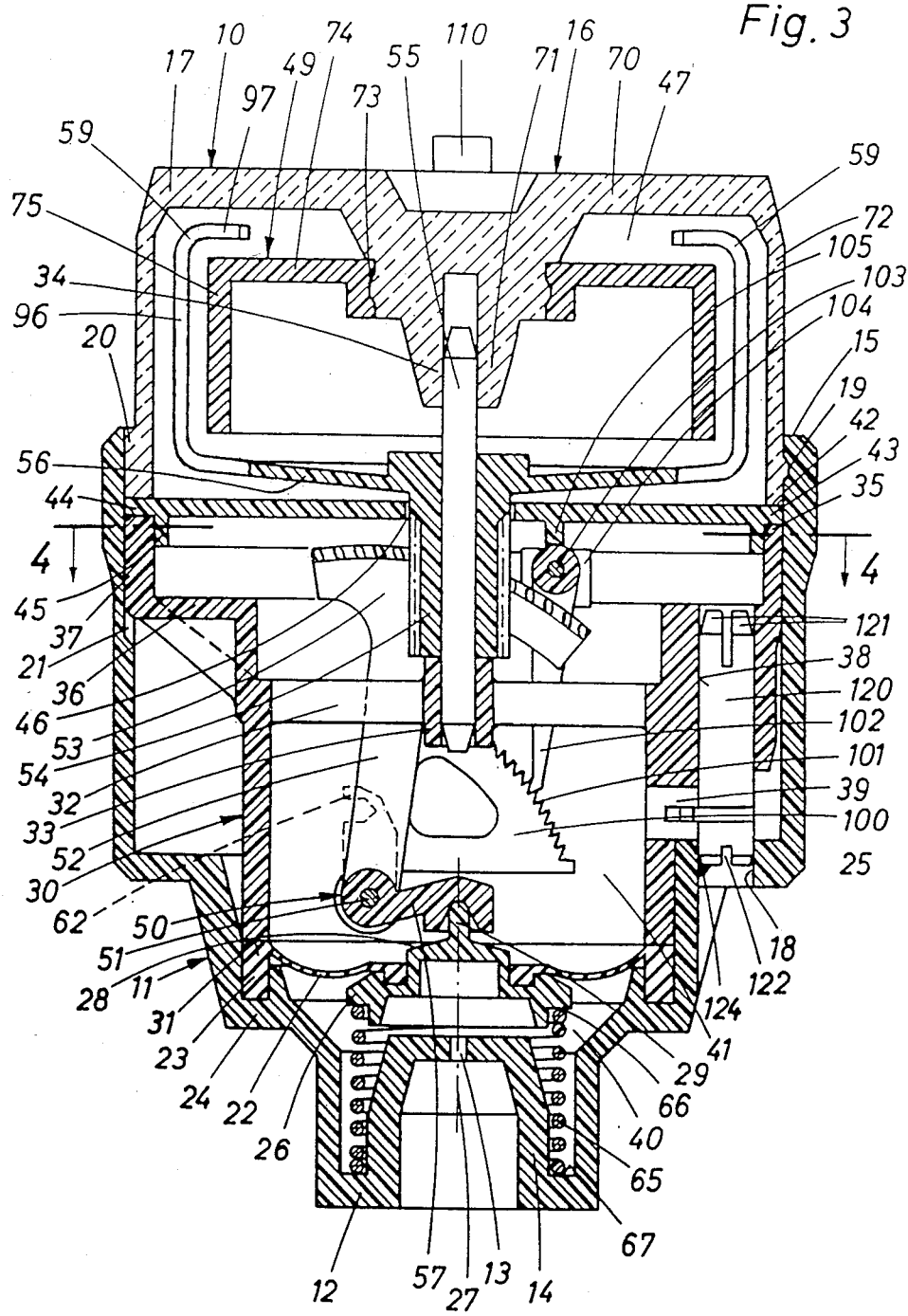
FIG. 3 shows the indicator device of the invention in an axial section taken along line 3—3 of FIG. 2.

Referring to FIG. 3, it can be seen that the indicator device 10 features a housing 11 with a housing bottom 12 in the center of which is arranged a connecting orifice 13. A connecting hub 14 formed by the housing bottom 12 forms part of a connection between the indicator device 10 and the clean air space of an air intake filter (not shown) of an air aspirating machine. This connection may or may not include a connecting line, depending on the location of the indicator device 10 in relation to the air intake filter.

The open end 15 of the housing 11 is closed off by means of a cover 16 of transparent plastic material which serves as an indicator window 17. The housing 11 and the cover 16 engage each other at their rims by means of a snap configuration 19. In order to secure a predetermined angular position of the cover 16 in relation to the housing 11, the cover 16 has on the outer side of its rim an axially oriented positioning key 20 with which it engages an axial positioning groove 21 of the housing 11.

On the inside the housing 11 is arranged a housing insert 30. The lower extremity 31 of the housing insert 30 abuts against the collar portion 23 of an annular diaphragm 22, thereby clamping the latter against a housing shoulder 24 of the housing side wall 25. The diaphragm 22 forms part of a piston 26 to which the inner periphery of the diaphragm 22 is sealingly attached.

The axis 27 of the piston 26 coincides with the longitudinal center axis of the indicator device 10, and the piston 26 and its diaphragm 22 subdivide the interior space of the housing 11 into a negative pressure chamber 40 between the piston 26 and the connecting orifice 13 and a drive chamber 41 above the piston 26. The drive chamber 41 is under atmospheric pressure, the housing 11 having a breather opening (not shown).

Inside the drive chamber 41 is arranged a bell crank 50 the pivot shaft 51 of which is oriented perpendicularly to, and located laterally offset from, the piston axis 27. An upwardly extending long arm 52 of the bell crank 50 carries on its upper end a gear segment 53. The laterally protruding teeth of the gear segment 53 cooperate with a pinion 54 on an indicator shaft 55 which is journalled in the center axis of the indicator device 10. A generally horizontally extending short arm 57 of the bell crank 50 has a downwardly facing V-shaved recess with which it engages a central drive nose 29 on the upper side 28 of the piston 26.

Cooperating with the piston 26 is a piston return spring 65 which has its upper extremity 66 engaged against the underside of the piston 26 and its lower extremity 67 supported on the housing bottom 12.

The pivot shaft 51 of the bell crank 50 carries an upwardly extending spring arm 62 which is engaged by the inner extremity 61 of a bell crank spring 60. This spring is a horizontally oriented tension spring (FIG. 4), its outer extremity 63 being adjustably attached to the housing side wall 25 in a way which is described further below. The purpose of the bell crank spring 60 is to maintain the short arm 57 in contact with the drive nose 29 of the piston 26 and, by virtue of its adjustability, to provide a simple means for calibrating the reading of the indicator device 10.

The bell crank spring 60 produces a downward bias on the piston 26, in opposition to the upward bias of the piston return spring 65. Its strength is less than the strength of the piston return spring 65.

The housing insert 30 has a cross member 32 which carries the lower bearing 33 for the indicator shaft 55. A cooperating upper bearing 34 is arranged in the cover 16. In the vicinity of its upper end face 35, the housing insert 30 has a positioning key 37 engaging the positioning groove 21 of the housing 11 to give the housing insert 30 a predetermined angular position inside the housing 11. On its diametrically opposite side, the housing insert 30 has a radial window 39 for the bell crank spring 60.

Between the upper end face 35 of the housing insert 30 and the lower end face 42 of the cover 16 is further arranged an intermediate cover 43 which is likewise angularly secured in relation to the housing 11 by means of a positioning key 44 in cooperation with the positioning groove 21 of the housing 11. The intermediate cover 43 is reinforced by means of a centering collar 45 engaging the upper extremity of the housing insert 30. A central opening 46 in the intermediate cover 43 accommodates the pinion 54.

The intermediate cover 43 serves as a bottom wall for an indicator chamber 47 inside which are arranged a rotatable indicator arm 56 and a stationary indicator dial 49. The indicator arm 56 is carried by the indicator shaft 55 and the angled pointers 59 are attached to the indicator arm 56 on diametrically opposite locations. The pointers 59 move inside an angled gap defined between the indicator window 17 of the cover 16 and the indicator dial 49.

The indicator window 17 of the cover 16 has the shape of a cap formed by a substantially flat top wall 70 with an interior hub 71 and a substantially cylindrical side wall 72. The rim at the lower extremity of the side wall 72 carries a bead as part of the earlier-mentioned snap configuration 19 with which the cover 16 is attached to the housing 11.

The indicator dial 49 has a shape which is similar to that of the indicator window, defining a top wall 74 which extends parallel to, and at a distance below, the top wall 70 of the indicator window 17, and a side wall 75 which extends in a similar, radially inwardly spaced relationship to the side wall 72 of the indicator window 17. The indicator dial 49 is permanently attached to the interior hub 71 of the cover 16 by means of a snap connection 73. The hub 71 also forms the upper bearing 34 for the indicator shaft 55.

Figure 1:
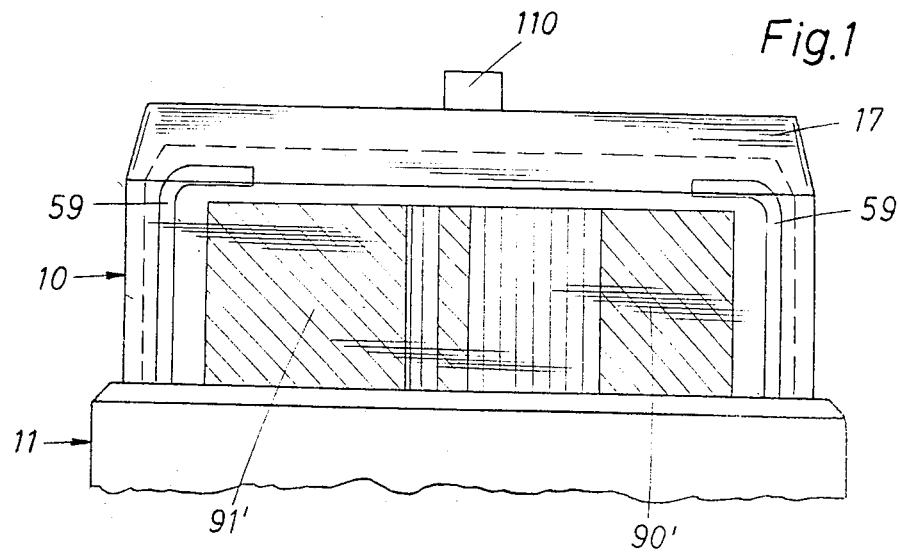
FIG. 1 shows, in an elevational view, the upper portion of an indicator device embodying the present invention.
Figure 2:
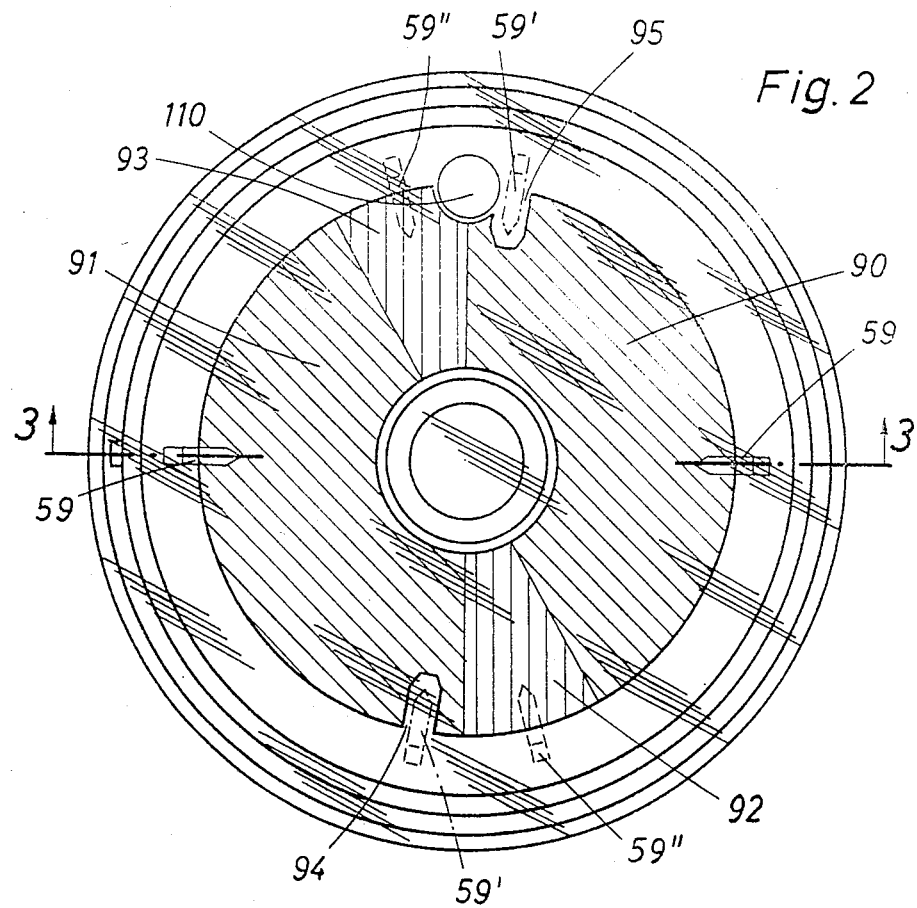
FIG. 2 shows the indicator device of FIG. 1 in a plan view.

As can be seen in FIGS. 1 and 2, the dial side wall 75 and the dial top wall 74 define on their outer surface four dial fields 90...93. These dial fields are arranged in two pairs of symmetrical diametrically oppositely located fields, the larger dial fields 90 and 91 being green and the smaller dial fields 92 and 93 being red. The sector-shaped portions of the dials fields on the dial top wall 74 are adjoined by rectangular dial field portions 90'...93' on the dial side wall 75.

The two pointers 59 of the indicator arm 56 have parallel axially extending pointer portions 96 with which they move over the rectangular dial field portions on the dial side wall 75 and adjoining radially inwardly extending pointer portions 97 with which they move over the sector-shaped dial field portion on the dial top wall 74.

The length of the radial portions 97 of the pointers 59 exceeds the width of the radial gap between the side wall 72 of the window 17 and the dial side wall 75. Therefore, in order to permit the insertion of the pointers 59 into the gap between the indicator window 17 and the indicator dial 49, the latter has two insertion slots 94 and 95 located diametrically opposite each other (FIG. 2). The insertion slots 94 and 95 extend axially through the dial side wall 75 and a radial distance into the dial top wall 74, as can be seen in FIG. 2.

It should be understood that the indicator dial 49, in the place of the colored dial fields 90 . . . 93 on its top wall 74 and side wall 75, could also have appropriate gradation lines. The colored dial fields have the advantage of easy readability of the indicator device from any angle.

The bell crank 50 and its pivot shaft 51 carry a ratchet wheel segment 100 with a series of ratchet teeth 101 on its outer periphery. Cooperating with the ratchet wheel segment 100 is a pawl 102, the pivot shaft 103 of which is supported in two bearing blocks 104 projecting from the upper side of the radial wall 36 of the housing insert 30. In the place of horizontal bores, the two bearing blocks 104 have upwardly open grooves into which the pivot shaft 103 is deposited at the time of assembly. A transverse rib 105 on the lower side of the intermediate cover 43 extends above the pivot shaft 103, retaining the latter in its bearings 104.

Figure 6:
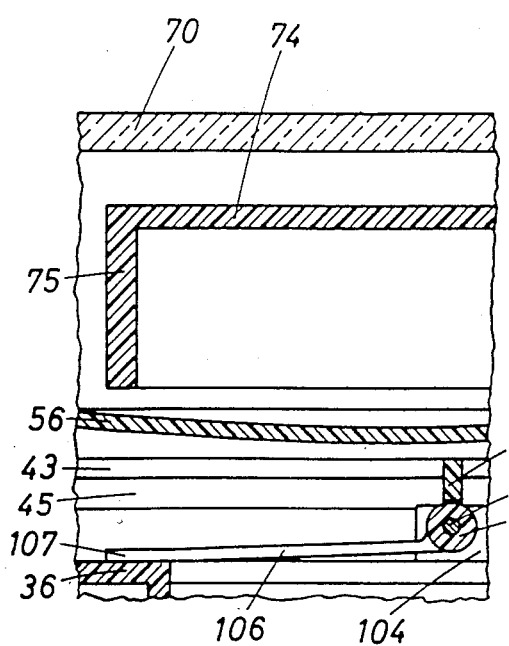
FIG. 6 is a partial axial section taken along line 6—6 of FIG. 4.
Figure 4:
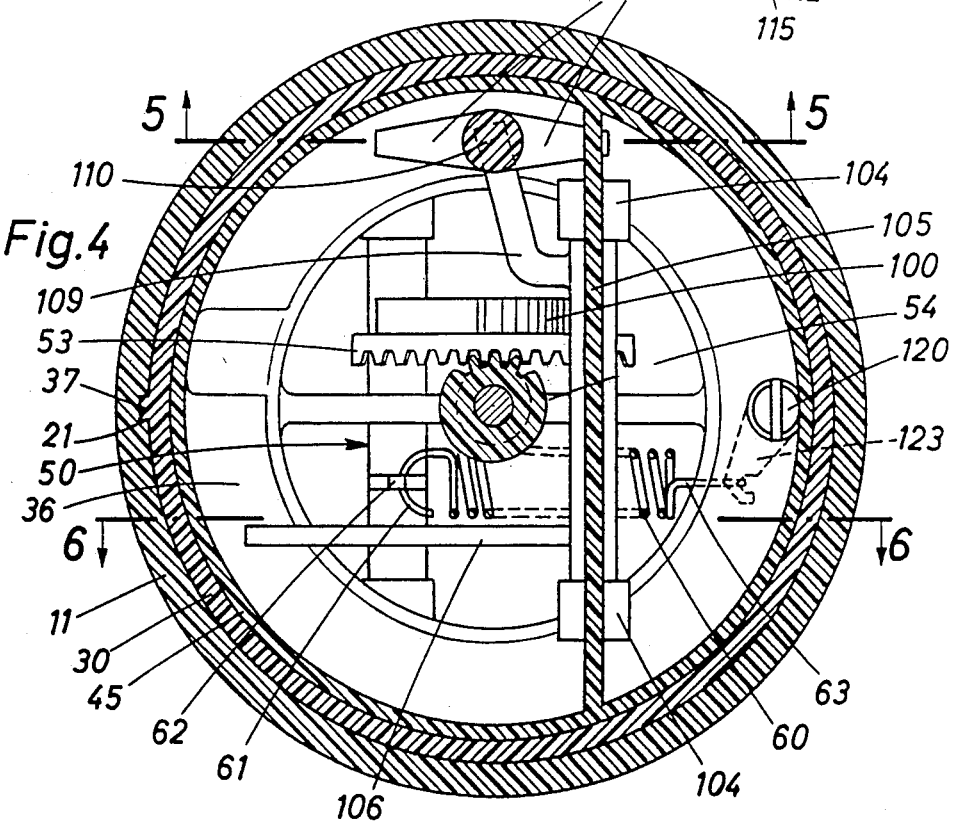
FIG. 4 is a radial cross section taken along line 4—4 of FIG. 3.

Attached to the pawl 102 and its pivot shaft 103 is a spring arm 106. A distal extremity 107 of the spring arm 106 bears against the upper side of the radial wall 36 of the housing insert 30, as can be seen in FIGS. 4 and 6. The spring arm 106, being under a bending preload, gently urges the pawl 102 against the ratchet teeth 101 of the ratchet wheel segment 100.

Figure 5:
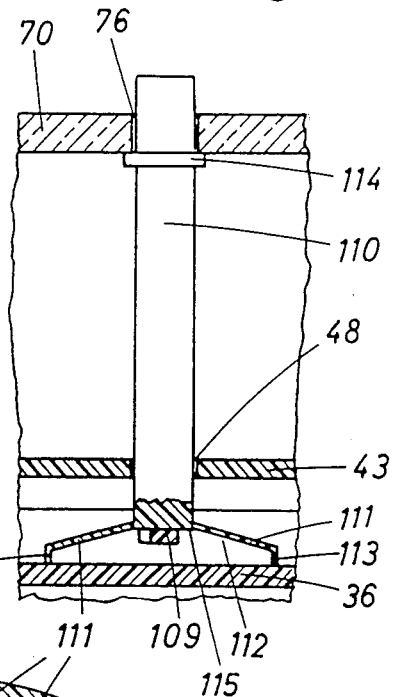
FIG. 5 is a partial axial section taken along line 5—5 of FIG. 4.

The indicator device also features a reset button 110 protruding above its cover 16 and reaching downwardly through an upper guide bore 76 in the top wall 70 of cover 16 and a lower guide bore 48 in the intermediate cover 43. As can be seen in FIGS. 4 and 5, the reset button 110 is arranged vertically above the radial wall 36 of the housing insert 30, its lower extremity 115 being spaced a certain distance above the wall 36. A convexly curved leaf spring 111 engages the radial wall 36 and bears against the lower extremity 115 of the reset button 110, thereby biasing the latter into its normal upper position which is determined by an abutment collar 114 of the reset button 110 in cooperation with the inner side of the top wall 70 of cover 16.

An angled reset arm 109, attached to the hub 108 of the pawl 102, extends horizontally to a point underneath the lower extremity 115 of the reset button 110, so that, when the reset button 110 is depressed, its lower extremity 115 pushes the reset arm 109 downwardly, thereby producing a pivoting movement of the pawl 102 away from the ratchet teeth 101. In order to accommodate the reset button 110 inside the indicator chamber 47, the indicator dial 49 has on its periphery a radial recess immediately adjacent to its insertion slot 95, in an angular area not reached by the pointers 59.

FIG. 4 shows the spring arm 106 and the reset arm 109 to be attached to the pawl hub 108 on opposite ends of the pawl hub 108. It is also possible to combine the spring arm 106 with the reset arm 109 by attaching the spring arm to the "knee" of the angled reset arm 109 in the form of a radial extension of the latter.

In an axial bore 38 near the outer periphery of the housing insert 30 is arranged a spring adjustment pin 120 which carries a radial spring arm 123 (FIG. 4). The spring arm 123 is arranged at the level of the radial window 39 in the wall of the housing insert 30 (FIG. 3), having attached to it the outer extremity 63 of the bell crank spring 60. The radial window 39 is wide enough to permit the rotation of the spring arm 123 to the inside of the housing insert 30 for the attachment of the bell crank spring 60.

The upper end portion of the spring arm 123 forms two resilient friction legs 121. The resulting rotational friction between the friction legs 121 and the axial bore 38 retains the spring adjustment pin 120 in its angular adjustment position. The lower extremity of the spring adjustment pin 120 extends downwardly into an access bore 18 in the housing wall 25 of the housing 11. A tool slot 122 in this extremity is engageable by a screw driver. Following the calibration of the indicator device through angular adjustment of the spring adjustment pin 120, the position of the latter is secured by means of a spot of glue 124.

In the embodiment of the indicator device as illustrated in the drawings and described above, the cover 16 is a transparent plastic part and the remaining parts of the device are opaque plastic parts, with the exception of the piston return spring 65, the bell crank spring 60, the indicator shaft 55, and the pivot shafts 51 and 103, which are of steel, and the diaphragm 22 which is of soft rubber.

The operational position of the indicator device 10, as shown in the drawing, represents a condition of the air intake filter which is "acceptable", i.e. a condition in which the flow resistance across the filter is still below the critical resistance at which cleaning or replacement of the filter cartridge becomes necessary. This is reflected by the position of the pointers 59 which is shown to be in the midposition of their indicating range and, accordingly, in the area of the green dial fields 90 and 91.

The pawl 102 is engaged between two ratchet teeth 101 of the ratchet wheel segment 100. If, at this point, the air aspirating machine monitored by the dirt indicator device is shut down, the pawl 102 acts to hold the position of the pointers 59 in the nearest counterclockwise detent position determined by the ratchet teeth 101.

In FIG. 2, the rest position of the pointers 59 is shown at 59', where the radial pointer portions 97 are in angular alignment with the insertion slots 94 and 95. This is also the position in which the cover 16 with the attached indicator dial 49 is snapped onto the housing 11 in a final assembly step.

As the flow resistance across the air intake filter increases, the pressure in the clean air space of the filter and in the connected negative pressure chamber 40 of the indicator device decreases correspondingly. The reduction in pressure on the underside of the piston 26 produces a downward axial displacement of the piston 26. This displacement is accompanied by an angular displacement of the bell crank 50, as its short arm 57 follows the piston 26, under the bias of the bell crank spring 60. The gear segment 53, in engagement with the pinion 54, transmits the angular displacement of the bell crank 50 to the indicator shaft 55, producing a magnified angular movement of the indicator arm 56 and its two pointers 59.

At a flow resistance across the air intake filter at which the pointers 59 reach the position 59" in alignment with the read dial fields 92 and 93, the reading of the indicator device represents a warning signal to the operator that the dirt accumulation on the surface of the filter cartridge has reached a critical level and that servicing in the form of cleaning or replacement of the filter cartridge is necessary.

Under normal operation, the reading of the indicator device 10 does not follow the pressure fluctuations which take place in the clean air space of the intake filter, the pawl 102 of the ratchet mechanism blocking the bell crank 50 and the pointer shaft 55 in a position which corresponds to the highest previously encountered pressure drop across the filter. At the same time, the piston 26 is prevented from executing axial upward movements under the pressure of the piston return spring 65.

If, following the shutdown of the air aspirating machine, it is desired to return the pointers 59 to their rest position 59', the reset button 110 is depressed against the cover 16 of the device. This action produces a downward movement of the reset arm 109 towards the radial wall 36 of the housing insert 30 and a corresponding rotation of the pawl 102 out of engagement with the ratchet wheel segment 100, under further bending of the spring arm 106.

The disengagement of the ratchet mechanism frees the piston 26 and the connected indicator mechanism to move upwardly under the bias of the piston return spring 65, until the pointers 59 reach their rest position 59'. The return movement of the piston 26 is slowed by the restricted air flow into the negative pressure chamber 40 through the connecting orifice 13.

It is also possible to operate the reset button 110 while the air aspirating machine is in operation. In this case, the indicating mechanism returns to a position which reflects the pressure drop momentarily occurring in the air intake filter. The reading changes as the pressure drop changes, for as long as the reset button 110 remains depressed.

It is to be understood that the invention is not limited in its application to the details of construction and arrangement of parts illustrated in the accompanying drawings, since the invention is capable of other embodiments and of being practiced or carried out in various ways. It is also to be understood that the phraseology or terminology employed herein is for the purpose of description and not of limitation.

We claim the following:

1. A device for the visual indication of dirt accumulations on air intake filters of air aspirating machines in the form of a reading which reflects the negative pressure in the clean air space of the air intake filter, the device comprising in combination:
    a generally pot-shaped indicator housing having a vertical center axis, a housing bottom, a housing side wall, and an open upper end;
    a cap-like cover attached to the open upper end of the indicator housing, the cover having a top wall and an adjoining side wall and defining a window of transparent material occupying at least a portion of its top wall and at least a portion of its side wall;

a cap-like indicator dial having a top wall with an axially readable dial face and an adjoining side wall with a radially readable dial face, the indicator dial being attached to the inner side of the cover in a concentric, axially and radially spaced relationship thereto, so as to define an annular pointer gap between the cover and the two dial faces of the indicator dial, the pointer gap including an axial gap portion which is open to the indicator housing on its lower end and a radial gap portion which extends radially inwardly from the upper end of the axial gap portion;

a diaphragm piston arranged in the indicator housing for axial displacements along the housing center axis, the diaphragm piston dividing the interior space of the indicator housing into a negative pressure chamber between the lower side of the piston and the bottom wall of the indicator housing and a drive chamber on the upper side of the piston, the negative pressure chamber being in communication with the clean air space of the air intake filter, and the drive chamber being under atmospheric pressure;

return spring means for biasing the diaphragm piston axially upwardly, in opposition to piston displacements caused by a lowering of the pressure level in the negative pressure chamber;

a vertical indicator shaft arranged inside the indicator housing and journalled in the housing center axis;

an indicator arm attached to the indicator shaft, the indicator arm carrying a pointer which is arranged to reach into said pointer gap from its open lower end, a vertical portion of the pointer being movable in the axial gap portion, so as to produce a reading on the radially readable dial face, and an adjoining horizontal portion of the pointer being movable in the radial gap portion, so as to produce a reading on the axially readable dial face; and drive transmission means for connecting the diaphragm piston to the indicator shaft so as to translate the axial displacements of the diaphragm piston into angular displacements of the indicator shaft and its pointers.

2. An indicator device as defined in claim 1, further comprising
means for adjusting the return spring means from outside the indicator housing.

3. An indicator device as defined in claim 1, further comprising
means for blocking return movements of the indictor shaft from a position reflecting a lower pressure level in the negative pressure chamber to a position reflecting a higher pressure level; and
means for releasing the return movement blocking means, so as to permit a return movement of the indicator shaft.

4. An indicator device as defined in claim 1, wherein
the indicator dial has axially readable dial faces on diametrically opposite sides of the housing and angularly aligned radially readable dial faces on diametrically opposite sides of the housing center axis;
the indicator arm carries two pointers in diametrically opposite relation to the indicator shaft, the two pointers being arranged to reach into said pointer gap with parallel vertical length portions and adjoining horizontal length portions, so as to produce dual readings on the axially readable dial faces and dual readings on the radially readable dial faces.

5. An indicator device as defined in claim 4, wherein
the horizontal distance between the extremities of the two pointers is smaller than the outer diameter of the indicator dial;
the indicator dial has on its periphery two diametrically oppositely located insertion slots; and
the angular location of the insertion slots on the indicator dial corresponds to the angular position of the two pointers in the rest position of the indicator device.

6. An indicator device as defined in claim 4, wherein
the indicator dial has on its axially readable dial face two pairs of diametrically oppositely located dial fields covering substantially sector-shaped areas of said dial face, and the indicator dial has on its radially readable dial face two pairs of substantially rectangular areas in angular alignment with said sector-shaped areas, one set of said aligned pairs of dial fields being angularly larger than the other;
the set of larger dial fields is marked to indicate a range of acceptable readings and occupies a major portion of two semi-circles on opposite sides of the housing center axis, and the set of smaller dial fields is marked to indicate a range of unacceptable readings and occupies a much smaller, fractional portion of the two semi-circles;
the angular movement range of the indicator arm extends from a rest position in which the pointers are located near one angular extremity of the larger dial fields, to a maximum-deflection position in which the pointers are located within the smaller dial fields adjoining the opposite angular extremity of the larger dial fields, said maximum-deflection position reflecting a critically low pressure in the negative pressure chamber, indicative of critical dirt accumulation in the air intake filter.

7. An indicator device as defined in claim 6, wherein
said pairs of dial fields extend over substantially 360° of the axially readable dial face and of the radially readable dial face of the indicator dial;
the pairs of larger dial fields are colored green, and the pairs of smaller dial fields are colored red; and
the window defined by the cover extends over substantially 360° on the top wall and on the side wall of the cover.

8. An indicator device as defined in claim 1, wherein
the cover has a central axially downwardly extending hub portion; and
the indicator dial is attached to said hub portion.

9. A device for the visual indication of dirt accumulations on air intake filters of air aspirating machines in the form of a reading which reflects the negative pressure in the clean air space of the air intake filter, the device comprising in combination:
a generally pot-shaped indicator housing having a vertical center axis, a housing bottom, a housing side wall, and an open upper end;
a cover attached to the open upper end of the indicator housing, the cover defining a window of transparent material occupying at least a portion of the surface of the cover;
an indicator dial arranged underneath the cover, at a distance therefrom, so as to define a pointer gap between the cover and the indicator dial;

a diaphragm piston arranged in the indicator housing for axial displacements along the housing center axis, the diaphragm piston dividing the interior space of the indicator housing into a negative pressure chamber between the lower side of the piston and the bottom wall of the indicator housing and a drive chamber on the upper side of the piston, the negative pressure chamber being in communication with the clean air space of the air intake filter, and the drive chamber being under atmospheric pressure;

a piston return spring of the compression spring type arranged between the diaphragm piston and the bottom wall of the indicator housing, the piston return spring biasing the diaphragm piston axially upwardly, in opposition to piston displacements produced by a lowering of the pressure level in the negative pressure chamber;

a vertical indicator shaft arranged inside the indicator housing and journalled in the housing center axis;

an indicator arm attached to the indicator shaft, the indicator arm carrying a pointer which is arranged to reach into said pointer gap;

a bell crank arranged in the drive chamber of the indicator housing on a horizontal pivot axis which is located at a lateral distance from the housing center axis, the bell crank having a long arm extending substantially vertically upwardly and a short arm extending substantially horizontally to the center of the diaphragm piston, into driving engagement with said piston;

gear teeth on the upper end of the long arm of the bell crank forming a gear segment about the bell crank pivot axis;

a pinion on the indicator shaft cooperating with the gear segment on the bell crank to translate angular displacements of the bell crank into magnified angular displacements of the indicator shaft and its pointer;

a bell crank spring biasing the bell crank in the pivoting direction towards the diaphragm piston, so as to apply to the diaphragm piston a preload which is opposed to and smaller than the bias of the piston return spring; and means for adjusting the bell crank spring from outside the indicator housing, so as to adjust its preload on the diaphragm piston.

10. An indicator device as defined in claim 9, further comprising means for blocking return movements of the indictor shaft from a position reflecting a lower pressure level in the negative pressure chamber to a position reflecting a higher pressure level; and means for releasing the return movement blocking means, so as to permit a return movement of the indicator shaft.

11. An indicator device as defined in claim 10, wherein the return movement blocking means includes a ratchet wheel segment connected to the bell crank, the ratchet wheel segment having ratchet teeth arranged concentrically to the teeth of the gear segment;

the return movement blocking means further includes a pointed ratchet pawl on a pivot axis which is parallel to the pivot axis of the bell crank, and means for biasing the ratchet pawl towards the ratchet wheel segment, so that the point of the ratchet pawl engages a gap between two ratchet teeth, the inclination of the ratchet pawl in relation to the ratchet wheel segment being such that angular movements of the ratchet teeth past the tip of the spring-biased ratchet pawl are possible only in the direction opposite to said return movements; and the releasing means is a pawl releasing means which includes a reset member which is accessible from outside the indicator assembly, the reset member remaining in a rest position under a biasing force, being operatively connected to the ratchet pawl in such a way that, when the reset member is actuated in opposition to said biasing force, it moves the ratchet pawl in opposition to said ratchet pawl biasing means, thereby freeing the ratchet wheel segment and the connected bell crank to execute a return movement.

12. An indicator device as defined in claim 11, wherein the ratchet pawl biasing means includes a spring arm connected to the ratchet pawl, a distal end of the spring arm engaging a shoulder of the indicator housing under a bending preload.

13. An indicator device as defined in claim 11, wherein the reset member of the ratchet pawl releasing means is a reset button protruding upwardly from the cover and extending downwardly into the indicator housing, the reset button being guided for vertical movements;

the ratchet pawl releasing means further includes a reset button spring as part of the release button, the reset button spring urging the release button upwardly to provide said biasing force; and the ratchet pawl releasing means further includes a reset arm which is solidary with the ratchet pawl, the reset arm having a distal extremity cooperating with the lower extremity of the reset button in such a way that, when the reset button is pushed downwardly, in opposition to the reset button spring, it engages the reset arm, moving it and the attached ratchet pawl away from the ratchet wheel segment to free the ratchet wheel segment and the connected bell crank for the execution of a return movement.

14. An indicator device as defined in claim 10, wherein the indicator housing has the shape of a body of rotation;

the diaphragm piston has a peripheral collar supported on its lower axial side by a housing shoulder between the housing bottom and the housing side wall;

the indicator housing includes a housing insert in the shape of a sleeve which is arranged concentrically inside the indicator housing;

the housing insert has a lower axial end face with which it abuts against the upper axial side of the peripheral collar of the diaphragm piston, so as to clampingly position the peripheral collar against the housing bottom; and the cover cooperates with the housing insert by transmitting thereto a downward clamping force.

15. An indicator device as defined in claim 14, wherein the housing insert has a horizontal cross member in the center of which the indicator shaft is journalled;

the housing insert has a side wall supporting the pivot axis of the bell crank;

the means for adjusting the bell crank spring is mounted in the housing insert, being accessible from outside the indicator housing through an opening in the latter; and the means for blocking the return movements of the indicator shaft includes a ratchet wheel segment on the indicator shaft pivot shaft and a ratchet pawl on a horizontal pivot shaft which is supported by the housing insert.

16. An indicator device as defined in claim 14, wherein
the indicator housing further includes a horizontal, substantially flat intermediate cover which is retained between the housing insert and the cover.

17. An indicator device as defined in claim 9, wherein
the bell crank spring is a substantially horizontally oriented tension spring having inner and outer extremities, the inner extremity being attached to a spring arm on the bell crank pivot axis, at a point which is located vertically above the bell crank pivot;

the bell crank spring adjusting means includes a vertical bore in the indicator housing the lower end of which is open to the outside of the indicator housing and a spring adjustment pin which is rotatably received in said vertical bore, the adjustment pin carrying a horizontally extending spring arm to which the outer extremity of the bell crank spring is attached; and the bell crank spring adjusting means further includes means for securing the spring adjustment pin in any one of a number of angular adjustment positions.

18. A device for the visual indication of dirt accumulations on air intake filters of air aspirating machines in the form of a reading which reflects the negative pressure in the clean air space of the air intake filter, the device comprising in combination:

a generally pot-shaped indicator housing having a vertical center axis, a housing bottom, a housing side wall, and an open upper end;

a sleeve-like housing insert arranged concentrically inside the indicator housing, the housing insert including a diagonal cross member;

a cap-like cover of transparent material attached to the open upper end of the indicator housing, the cover having an axially downwardly extending central hub portion;

a cap-like indicator dial having a top wall and an adjoining side wall, the indicator dial being attached to the hub portion of the cover in a concentric, axially and radially spaced relationship to the cover, so as to define an annular pointer gap between the cover and the indicator dial, the pointer gap including an axial gap portion which is open to the indicator housing on its lower end and a radial gap portion which extends radially inwardly from the upper end of the axial gap portion;

a vertical indicator shaft arranged inside the indicator housing, the upper end of the indicator shaft being journalled in the hub portion of the cover and its lower end being journalled in the cross member of the housing insert;

a horizontal indicator arm attached to the indicator shaft, the indicator arm carrying two pointers in diametrically opposite relation to the indicator shaft, the two pointers being arranged to reach upwardly into said pointer gap with parallel vertical length portions and adjoining horizontal length portions;

a diaphragm piston arranged in the indicator housing for axial displacements along the housing center axis, the diaphragm piston dividing the interior space of the indicator housing into a negative pressure chamber between the lower side of the piston and the bottom wall of the indicator housing and a drive chamber on the upper side of the piston, the negative pressure chamber being in communication with the clean air space of the air intake filter, and the drive chamber being under atmospheric pressure;

a piston return spring of the compression spring type arranged between the diaphragm piston and the bottom wall of the indicator housing, the piston return spring biasing the diaphragm piston axially upwardly, in opposition to piston displacements produced by a lowering of the pressure level in the negative pressure chamber;

a bell crank arranged in the drive chamber of the indicator housing on a horizontal pivot axis which is located at a distance from the housing center axis, the bell crank having a long arm extending substantially vertically upwardly and a short arm extending substantially horizontally to the center of the diaphragm piston and into driving engagement with said piston;

gear teeth on the upper end of the long arm of the bell crank forming a gear segment about the bell crank pivot axis;

a pinion on the indicator shaft cooperating with the gear segment on the bell crank to translate angular displacements of the bell crank into magnified angular displacements of the indicator shaft and its pointers;

a substantially horizontally oriented bell crank spring of the tension type having one extremity attached to a spring arm on the bell crank pivot axis, at a point located radially between the pivot axis and the gear segment and extending in in the same general direction as the small pivot arm of the bell crank, so as to bias the small pivot arm against the diaphragm piston and to apply to it a preload in opposition to the bias of the piston return spring;

a spring adjustment pin rotatably arranged in a vertical bore of the housing insert, the spring adjustment pin carrying a radially extending spring arm to which the other extremity of the bell crank spring is attached and including means for securing the spring adjustment pin in any one of a number of angular adjustment positions;

an opening in the wall of the indicator housing in the area of the lower extremity of the spring adjustment pin for access thereto with a pin adjustment tool;

a ratchet wheel segment connected to the bell crank, the ratchet wheel segment having ratchet teeth arranged concentrically to the teeth of the gear segment;

a pointed ratchet pawl extending downwardly from a pivot axis which is arranged parallel to and vertically above the bell crank pivot axis, on the opposite side of the housing center axis, and means for biasing the ratchet pawl towards the ratchet wheel segment, so that the point of the ratchet pawl engages a gap between two ratchet teeth at an inclination to said teeth at which angular movements of the ratchet teeth past the tip of the spring-biased ratchet pawl are possible only in a downward direction;

a reset button protruding upwardly from the cover and extending downwardly into the indicator housing, the reset button being guided for vertical movements and biased upwardly into a rest position; and a reset arm extending horizontally from the ratchet pawl pivot axis to a point underneath the lower extremity of the reset button so that, when the reset button is depressed, it engages the reset arm, moving it and the attached ratchet pawl away from the ratchet wheel segment, thereby freeing the ratchet wheel segment and the connected bell crank for the execution of a return movement.

* * * * *